United States Patent

Medem et al.

[45] Sep. 30, 1980

[11] 4,225,698

[54] OPTICAL COMPONENTS CONSISTING OF AROMATIC POLYESTERS MOLDED IN THE FORM OF AN OPTICAL LENS

[75] Inventors: Harald Medem; Dieter Freitag, both of Krefeld; Hans Hespe, Leverkusen; Carl Heynemann, Taufkirchen, all of Fed. Rep. of Germany

[73] Assignee: Bayer Aktiengesellschaft, Fed. Rep. of Germany

[21] Appl. No.: 4,706

[22] Filed: Jan. 19, 1979

[30] Foreign Application Priority Data

Jan. 24, 1978 [DE] Fed. Rep. of Germany ....... 2802978

[51] Int. Cl.$^2$ ............................................. C08G 63/18
[52] U.S. Cl. ...................................... 528/176; 264/1; 350/175 R; 528/128; 528/173; 528/191; 528/192; 528/194
[58] Field of Search ............... 528/194, 176, 128, 173, 528/191, 192; 350/175 R; 264/1

[56] References Cited

U.S. PATENT DOCUMENTS

| | | | |
|---|---|---|---|
| 3,216,970 | 11/1965 | Conix | 528/194 |
| 3,317,464 | 5/1967 | Conix | 528/194 |
| 3,351,624 | 11/1967 | Conix | 528/194 |
| 4,011,199 | 3/1977 | McFarlane et al. | 528/194 |
| 4,102,864 | 7/1978 | Deex et al. | 528/194 |

*Primary Examiner*—Lester L. Lee
*Attorney, Agent, or Firm*—Connolly and Hutz

[57] ABSTRACT

Thermoplastic aromatic polyesters comprising cocondensed bisphenol residues generally have a refractive index $n_d$ of from 1.60 to 1.66, an Abbé coefficient $v_d$ of from 27 to 21 and a color triplet of about 5.1, 0.1, 0 and are excellent starting materials for the production of optical components, particularly high quality lenses for still and cine cameras.

4 Claims, No Drawings

OPTICAL COMPONENTS CONSISTING OF AROMATIC POLYESTERS MOLDED IN THE FORM OF AN OPTICAL LENS

This invention relates to optical components, particularly high-quality lenses for still and cine cameras, essentially consisting of aromatic polyesters. Optical systems, for example lenses for photographic cameras, have been produced from transparent plastics. It is only thermoplastic plastics which have acquired any practical significance because they may be processed rationally and considerably better than glass. Thus, polymethyl methacrylate, for example, is used as a substitute for low refraction silicate glasses. Polystyrene, copolymers of styrene and bisphenol-A-polycarbonate are also used, primarily for diverging lenses.

The above-mentioned plastics may only be used for (a) multiple-lens systems (all plastics lenses) having a relative aperture ratio of at most 1:8, a maximum diffusion circle of up to 0.04 mm, as measured at 23° C./50% relative humidity, and a temperature coefficient of the focal length of:

$$\frac{\delta f}{\delta \nu} > 0.008 \frac{mm}{degree};$$

(b) multiple-lens systems comprising at least one glass lens and from 2 to 4 plastics lenses having a relative aperture ratio of at most 1:5.6, a maximum diffusion circle of up to 0.04 mm, as measured at 23° C./50% relative humidity, and a temperature coefficient of the focal length of:

$$\frac{\delta f}{\delta \nu} > 0.002 \frac{mm}{degree}$$

On account of the low power thereof, lens systems of this type may only be used under favorable light conditions.

Polymers having a refractive index $n_d$ of more than 1.59 are also known. Examples of such polymers include: polycarbodiimides, polybenzimidazoles, polyvinyl carbazole and certain polycarbonates. These plastics cannot be used for optical applications because they are either naturally colored, cannot be thermoplastically processed or cannot be produced in high molecular weight form.

The present invention relates to optical components, particularly optical lenses, essentially consisting of thermoplastic aromatic polyesters, having relative viscosities $\eta_{rel}$ of from 1.18 to 1.42 (as measured at 25° C. in $CH_2Cl_2$, c=5 g/l), comprising structural units corresponding to the following general formula:

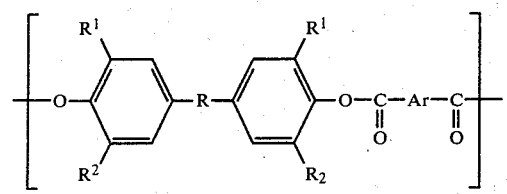

wherein
R represents the group

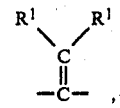

an oxygen atom, a carbonyl group or a sulphonyl group, a single bond, or, preferably,

and, with particular preference, a sulphur atom or

$R^1$ and $R^2$ independently represent a chlorine atom or a methyl group, preferably a hydrogen atom or a bromine atom;
$R^3$ and $R^4$ independently represent a hydrogen atom, a $C_1$-$C_6$ alkyl radical, preferably methyl or isopropyl, or a $C_5$-$C_{12}$ aryl radical, preferably phenyl,
n represents an integer of from 4 to 11; and
Ar represents

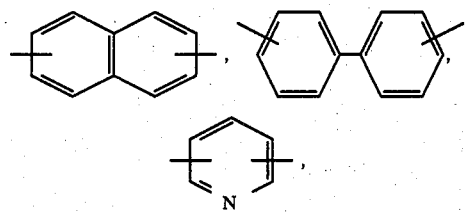

preferably

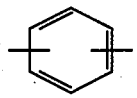

and more particularly

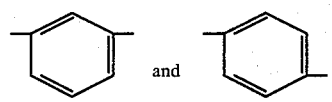

in a molar ratio of from 30:70 to 70:30, more particularly about 1:1.

The aromatic polyesters used according to the present invention may be based on one or more of the following diphenols:
4,4'-dihydroxy diphenyl,
2,2-bis-(4-hydroxyphenyl)-methane,
4,4'-dihydroxy tetraphenyl methane,
2,2-bis-(4-hydroxyphenyl)-propane (bisphenol A),
2,2-bis-(3,5-dimethyl-4-hydroxyphenyl)-propane,
2,2-bis-(3,5-dibromo-4-hydroxyphenyl)-propane (tetrabromobisphenol A), 2,2-bis-(3,5-dibromo-4-hydroxyphenyl)-propane,
1,1-bis-(4-hydroxyphenyl)-isobutane,
1,1-bis-(4-hydroxyphenyl)-cyclohexane,
1,1-bis-(4-hydroxyphenyl)-2,2-dichloroethylene,
4,4'-dihydroxydiphenyl sulphide (bisphenol S),
4,4'-dihydroxydiphenyl sulphone,
4,4'-dihydroxydiphenyl ether,
4,4'-dihydroxydiphenyl ketone
and other bisphenols of the type described, for example, in the book by H. Schnell entitled "Chemistry and Physics of Polycarbonates", Interscience Publishers, New York, 1964.

Dicarboxylic acids on which the polyesters may be based include: benzene, naphthalene, pyridine and diphenyl dicarboxylic acids. It is preferred to use benzene-1,3-dicarboxylic acid (isophthalic acid), benzene-1,4-dicarboxylic acid (terephthalic acid), naphthalene-2,6-dicarboxylic acid, pyridine-2,5-dicarboxylic acid and diphenyl-4,4-dicarboxylic acid. Mixtures of isophthalic acid and terephthalic acid in a molar ratio of from 30:70 to 70:30 are particularly preferred.

The polyesters used according to the present invention consist predominantly, preferably exclusively, of structural units which consist of at least one of the above-mentioned bisphenols and at least one of the above-mentioned dicarboxylic acids and which correspond to the above-defined general formula. The polyesters may also contain small proportions of structural units consisting of aliphatic diols instead of bisphenols or aliphatic dicarboxylic acids or carbonic acid instead of aromatic dicarboxylic acids.

The polymer chains of the aromatic polyesters are generally terminated by optionally substituted phenyl or benzoyl radicals. The content of free terminal carboxyl and hydroxyl groups is very small.

The aromatic polyesters should generally have average molecular weights (weight average, Mw) of from 10,000 to at least 100,000, preferably from 15,000 to 50,000 as determined by the scattered light method.

These polyesters generally have a refractive index $n_d$ of from 1.60 to 1.66, preferably from 1.61 to 1.66, and Abbé coefficient $v_d$ of from 27 to 21, preferably from 25 to 21, and a color triplet of about 5.1; 0.1; 0, as calculated in accordance wih DIN 4522, Part 5. The aromatic polyesters used in accordance with the present invention do not have any of the deficiencies referred to above so that it is possible to produce from them optical systems which show remarkable advantages over the prior art:

(1) Better correctability of image defects for larger radii of the lens surfaces (which facilitates production).
(2) An increase in the relative aperture ratio of the same diffusion circle.
(3) Improved resolution by reduction of the diffusion circle for the same relative aperture diameter.
(4) Reduction of the temperature coefficient in lens systems equipped solely with plastics lenses and in lens systems equipped with glass and plastics lenses.
(5) Production of lens systems having relative aperture diameters of more than 1:8 solely from plastics lenses.

The polyesters used in accordance with the present invention ideally satisfy the mechanical and thermal requirements which any optical material has to meet. They may be thermoplastically processed without any adverse effect upon the mechanical and optical properties thereof. They are dimensionally stable to heat up to at least 100° C., show high impact strength, minimal shrinkage on processing, low coefficients of expansion, low weight, low water absorption, good flow properties, good mold-release properties, high resistance to ageing and a color triplet of approximately 5.1; 0.1; 0, as calculated in accordance with DIN No. 4522, Part 5. Stabilizers, UV-absorbers, mold release agents and antistatic agents may be incorporated without adversely affecting these properties.

The polyesters may be produced by known processes, for example by transesterification in the melt from bisphenol and the corresponding dicarboxylic acid diphenyl ester, by the solution process in high-boiling solvents from bisphenol and the corresponding dicarboxylic acid dihalide or by the two-phase interface process which is generally preferred and which is briefly explained below.

Suitable interfacial polycondensation processes are described, for example, by W. M. Eareckson in J. Polym. Sci. XL, 399 (1959), in French Pat. No. 1,177,517 and in U.S. Pat. No. 3,234,167. In these processes, the reactants are dissolved in immiscible solvents and the reaction takes place at the interface between the solvents. Advantageously, an aqueous alkaline solution of a bisphenol and a solution of aromatic dicarboxylic acid dihalides in an organic solvent are allowed to act on one another with intensive stirring. It is best to keep the quantity of bisphenol and the quantity of dicarboxylic acid dihalides equivalent. Monofunctional hydroxy compounds, such as phenol, o-phenyl phenol and p-t-butyl phenol, or acid halides may optionally be added as chain-terminators.

In general, the presence of so-called "phase transfer catalysts" is of particular advantage. Tertiary ammonium, phosphonium, arsonium and sulphonium salts and, more recently, also crown ethers have proved to be effective phase transfer catalysts. It is preferred to use triethyl benzyl ammonium chloride and triphenyl octyl phosphonium bromide. Preferred alkalis are sodium and potassium hydroxides which are used in a slight excess, based on the bisphenol. Preferred organic solvents are those which are capable of dissolving the polyesters formed. Halogenated hydrocarbons are generally used for this purpose, methylene dichloride and chlorobenzene being particularly preferred. Dispersants, for example sodium lauryl sulphate, and antioxidants, for example sodium bisulphite, may also be added to the reaction mixture.

The interfacial condensation reaction is carried out at temperatures of from −20° to +80° C., preferably from 0° to 25° C., and under atmospheric pressure and is over in from 1 to 3 hours. The thus-produced aromatic polyesters may be isolated by known methods, for example by separating off the aqueous phase, repeatedly washing the organic phase with water and subsequently precipitating the polyester or evaporating off the solvent. The thus-obtained polyesters do not contain any hydrolyzable chlorine.

The yields are substantially quantitative.

The polyesters may be branched by the incorporation of small quantities, preferably quantities of from 0.05 to 2.0 mole % (based on the bisphenols used), of tri- or more highly functional compounds, particularly those containing three or more than three phenolic hydroxy groups.

One particularly important advantage of the aromatic polyesters used in accordance with the present invention is that the refractive index and optical dispersion of the materials may be freely determined within certain limits providing copolyesters are produced by the condensation of various monomers.

In this connection, the use of comonomers having a low content of alkyl radicals and/or a high content of bromine or sulphur atoms or aromatic radicals results in higher refractive indices.

Optical systems may be produced from the aromatic polyesters in accordance with the present invention by injection molding in the conventional way. The injection moldings obtained may be used without further processing.

EXAMPLE 1

Aromatic polyester of bisphenol A 680 g (17 moles) of NaOH, 1826.4 g (8 moles) of bisphenol A, 40 g of triethyl benzyl ammonium chloride, 6 g of sodium borohydride, 36 g (0.24 moles) of p-t-butyl phenol and 30 liters of $CH_2Cl_2$ are added, under nitrogen, to 40 liters of water. A solution of 812.2 g (4 moles) of isophthalic acid dichloride and 812.2 g (4 moles) of terephthalic acid dichloride in 5 liters of $CH_2Cl_2$ is then added dropwise over a period of 15 minutes at a temperature of 20° C. After stirring for 60 minutes and acidification using dilute phosphoric acid, the phases are separated, the organic phase is washed with water and concentrated by evaporation. After a heat stabilizer has been added, the polyester is extruded at 270° C. 2420 g of a clear colorless granulate having a relative viscosity of 1.25 (as measured in $CH_2Cl_2$ at 25° C., c=5 g/l) are obtained.

The granulate is injection molded into standard small test bars. The following properties are determined:

| impact strength: | unbroken |
|---|---|
| notched impact strength: | 8.9 kJ/m² |
| hardness: | 109 MPa |
| modulus in tension: | 2270 MPa |
| Vicat B: | 177° C. |
| refractive index $n_d$: | 1.6101 |
| Abbé coefficient $v_d$: | 24.8. |

EXAMPLE 2

Aromatic copolyester of bisphenol A and tetrabromobisphenol A 17 g (0.425 mole) of NaOH, 36.48 g (0.16 mole) of bisphenol A, 21.9 g (0.04 mole) of tetrabromobisphenol A, 1 g of $Na_2S_2O_4$, 1.5 g of triphenyl octyl phosphonium bromide and 0.6 g of p-t-butyl phenol are introduced, under nitrogen, into 2.0 liters of water. Following the addition of 1.5 liters of $CH_2Cl_2$, a solution of 20.3 g of terephthalic acid dichloride and 20.3 g of isophthalic acid dichloride in 500 ml of $CH_2Cl_2$ is added dropwise over a period of 15 minutes at a temperature of 20° C. After stirring for 60 minutes and acidification, the phases are separated off and the organic phase is washed with water. The solvent is removed, leaving 77 g of a colorless product having a relative viscosity of 1.30. The optical data, as measured on a film, are as follows:

$n_d = 1.6205$ and $v_d = 24.1$.

EXAMPLE 3

Aromatic polyester of tetrabromobisphenol A

The procedure is as in Example 2, except that 109.5 g (0.2 mole) of tetrabromobisphenol are used as the bisphenol component. 124 g of a colorless product having a relative viscosity of 1.26 are obtained. The optical data, as measured on a film, are as follows: $n_d = 1.6329$ and $v_d = 24.4$.

EXAMPLE 4

Aromatic copolyester of bisphenol A and 1,1-bis(4-hydroxyphenyl)-cyclohexane

The procedure is as in Example 2, except that 11.4 g (0.05 mole) of bisphenol A and 40.2 g (0.15 mole) of 1,1-bis-(4-hydroxyphenyl)-cyclohexane are used as the bisphenol components. 68 g of a colorless product having a relative viscosity of 1.42 are obtained. The optical data, as measured on a film, are as follows: $n_d = 1.60556$ and $v_d = 25.5$.

EXAMPLE 5

Aromatic polyester of 4,4'-dihydroxy tetraphenyl methane 17 g (0.425 mole) of NaOH, 70.4 g (0.2 mole) of 4,4'-dihydroxy tetraphenyl methane, 1, g of $NaBH_4$, 1.2 g of N,N'-dioctyl triethylene diammonium dibromide and 0.5 g of o-hydroxy biphenyl are introduced, under nitrogen, into 2000 ml of water. Following the addition of 1.5 liters of $CH_2Cl_2$, a solution of 24.36 g (0.12 mole) of isophthalic acid dichloride and 16.24 g (0.08 mole) of terephthalic acid dichloride in 500 ml of $CH_2Cl_2$ is added dropwise over a period of 15 minutes at a temperature of 20° C.

After stirring for 60 minutes and acidification, the phases are separated and the organic phase is washed with water. The solvent is removed, leaving 81 g of a colorless product having a relative viscosity of 1.29. The optical data, as measured on a film, are as follows: $n_d = 1.6403$ and $v_d = 23$.

EXAMPLE 6

Aromatic copolyester of bisphenol A and bisphenol S*

The procedure is as in Example 1, except that a mixture of 1095.8 g (4.8 moles) of bisphenol A and 698.3 g (3.2 moles) of bisphenol S is used as the bisphenol component. 2380 g of a clear colorless granulate having a relative viscosity of 1.23 are obtained. The optical data, as measured on round plates (30×2.5 mm), are as follows: $n_d = 1.6268$ and $v_d = 22.8$.

*Bisphenol S = 4,4'-thiodiphenol,
= 4,4'-dihydroxydiphenyl sulphide

We claim:

1. An optical component consisting essentially of a thermoplastic aromatic polyester molded in the form of an optical lens, said polyester having a relative viscosity of from 1.18 to 1.42 when measured at 25° C. in methylene dichloride at a concentration of 5 g/l and comprising structural units corresponding to the formula

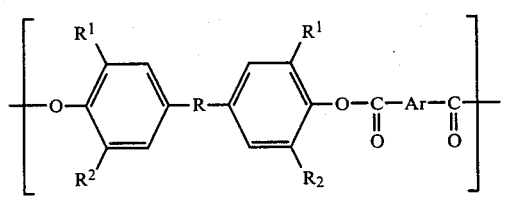

wherein R is

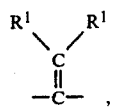

—O—, —CO—, —SO$_2$—, a bond,

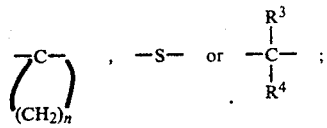

$R^1$ and $R^2$ are selected from the group consisting of chlorine, methyl, hydrogen and bromine; $R^3$ and $R^4$ are selected from the group consisting of hydrogen, alkyl having 1 to 6 carbon atoms and aryl having 5 to 12 carbon atoms; n is an integer of from 4 to 11 and Ar is

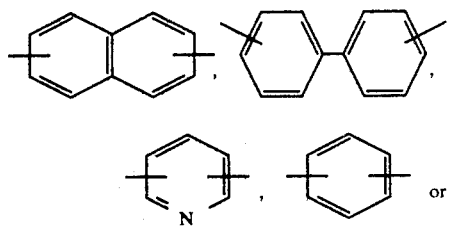

-continued

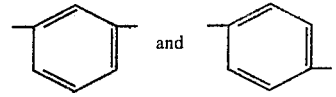

in a molar ratio of from 30:70 to 70:30.

2. An optical component as claimed in claim 1 wherein R is —S—,

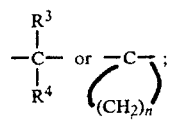

$R^1$ and $R^2$ are independently of each other hydrogen or bromine; $R^3$ and $R^4$ are independently of each other methyl, isopropyl or phenyl; n is an integer of 4 to 11 and Ar is

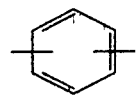

3. An optical component as claimed in claim 1 wherein Ar is

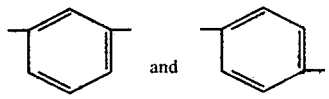

in a molar ratio of from 30:70 to 70:30.

4. An optical component as claimed in claim 3 wherein the molar ratio is about 1:1.

* * * * *